(12) United States Patent
Breijs (10) Patent No.: US 12,071,209 B2
(45) Date of Patent: Aug. 27, 2024

(54) SUPERVISORY CONTROL ARRANGEMENT FOR A VESSEL

(71) Applicant: Baggermaatschappij Boskalis B.V., Papendrecht (NL)

(72) Inventor: Alexander Adriaan Rudolf Breijs, Schiedam (NL)

(73) Assignee: BAGGERMAATSCHAPPIJ BOSKALIS B.V., Papendrecht (NL)

( * ) Notice: Subject to any disclaimer, the term of this patent is extended or adjusted under 35 U.S.C. 154(b) by 335 days.

(21) Appl. No.: 17/421,181

(22) PCT Filed: Jan. 10, 2020

(86) PCT No.: PCT/NL2020/050014
§ 371 (c)(1),
(2) Date: Jul. 7, 2021

(87) PCT Pub. No.: WO2020/145825
PCT Pub. Date: Jul. 16, 2020

(65) Prior Publication Data
US 2022/0073173 A1    Mar. 10, 2022

(30) Foreign Application Priority Data
Jan. 10, 2019 (NL) .................................. 2022366

(51) Int. Cl.
*B66C 23/52* (2006.01)
*B63B 27/10* (2006.01)
(Continued)

(52) U.S. Cl.
CPC .............. *B63B 79/40* (2020.01); *B63B 27/10* (2013.01); *B66C 13/18* (2013.01); *B66C 23/52* (2013.01); *G05D 1/0208* (2013.01)

(58) Field of Classification Search
CPC .......... B63B 79/40; B63B 27/10; B63B 27/19; B66C 13/18; B66C 23/52; B66C 13/46;
(Continued)

(56) References Cited

U.S. PATENT DOCUMENTS 10,633,815 B2 * 4/2020 Vartdal ................... E02D 27/52
2004/0159276 A1 * 8/2004 Persson ................... B63B 77/00
114/264
(Continued)

FOREIGN PATENT DOCUMENTS

CN 102712350 A * 10/2012 ............. B63B 1/107
EA 004201 B1 * 2/2003
(Continued)

OTHER PUBLICATIONS

WO2017204656A1, A Vessel and Method of Employing a Vessel, E.G. in a Process of Maintaining or Assembling an Offshore Windmill, and a Related Assembly; Kloster et al. (Year: 2017).*
(Continued)

*Primary Examiner* — B M M Hannan
(74) *Attorney, Agent, or Firm* — Pillsbury Winthrop Shaw Pittman, LLP (57) ABSTRACT

In a vessel for installing a structure onto or into a seabed, multiple actuators comprised by a dynamic positioning system and a structure positioning system may be used for controlling a position and/or orientation of the structure. When two actuators are actuated simultaneously or in rapid succession, instabilities may occur. Furthermore, two actuators may be working in opposite directions or with opposite control goals. To increase stability and/or workability of the vessel's actuators, a supervisory control arrangement is provided to interconnect control systems of different actuators of the vessel, for example the dynamic positioning system and the structure positioning system. Where previ-
(Continued)

ously the dynamic positioning system and the structure position system were individually operating system, with the supervisory control arrangement one system can take into account an input and/or output of the other system.

15 Claims, 4 Drawing Sheets (51) Int. Cl.
  *B63B 79/40* (2020.01)
  *B66C 13/18* (2006.01)
  *G05D 1/00* (2006.01)

(58) Field of Classification Search
  CPC ....... B66C 23/185; B66C 23/53; B66C 23/88; G05D 1/0208; B63H 25/42
  USPC .......................................................... 701/21
  See application file for complete search history.

(56) References Cited

U.S. PATENT DOCUMENTS

| 2010/0067989 | A1* | 3/2010 | Brown ................. | B63B 35/003 405/196 |
|---|---|---|---|---|
| 2010/0230370 | A1 | 9/2010 | Schneider et al. | |
| 2012/0266796 | A1* | 10/2012 | Roodenburg ......... | B66C 23/185 405/224 |
| 2013/0034391 | A1* | 2/2013 | Foote ..................... | E02D 27/42 405/207 |
| 2015/0056020 | A1* | 2/2015 | Bleasdale ........... | E02B 17/0004 405/195.1 |
| 2016/0327014 | A1* | 11/2016 | Trevarthen .............. | F03B 13/22 |
| 2017/0174480 | A1* | 6/2017 | Mastebroek ............ | B63B 27/10 |
| 2019/0127939 | A1* | 5/2019 | Kjersem ............... | E21B 15/003 |

FOREIGN PATENT DOCUMENTS

| EP | 3305650 | A1 | | 4/2018 |
|---|---|---|---|---|
| EP | 3382335 | A1 | | 10/2018 |
| JP | 2007522470 | A6 | * | 8/2007 |
| JP | 2009280960 | A | * | 12/2009 |
| KR | 20060110366 | A | * | 10/2006 |
| NO | 20160866 | A1 | * | 11/2017 |
| WO | WO-2017204656 | A1 | * | 11/2017 |
| WO | 2018/117846 | A1 | | 6/2018 |
| WO | 2018/228809 | A1 | | 12/2018 |

OTHER PUBLICATIONS

JP2009280960A, Pumping Mechanism and Sea Bottom Resource Recoveringapparatus; Kobayashi Heihachiro. (Year: 2009).*
International Search Report dated Apr. 1, 2020, issued in corresponding International Patent Application No. PCT/NL2020/050014 (2 pgs.).
International Preliminary Report on Patentability dated May 3, 2021, issued in corresponding International Patent Application No. PCT/NL2020/050014 (19 pgs.).
Martijin Wittingen, "Offshore Wind Turbine Monopile Foundation Installation with a Dynamic Positioned Vessel", A feasibility study by modeling, Master of Science Thesis, Delft University of Technology, Oct. 29, 2018, 125 pgs.
Exclusive: OHT Orders Offshore Wind Foundation Installation Vessel, Jul. 16, 2018, downloaded Dec. 22, 2023, 3 pgs.: https://www.offshorewind.biz/2018/07/16/exclusive-oht-orders-offshore-wind-foundation-installation-vessel/.
Combined expertise cuts wind turbine installation times, May 8, 2018, downloaded Dec. 22, 2023, 2 pgs.: http://w3.windfair.net/wind-energy/pr/28220-macgregor-kongsberg-maritime-installation-offshore-wind•turbine-pile-gripper-monopile.
Combined expertise cuts wind turbine installation times, Apr. 26, 2018, downloaded Feb. 28, 2024, 3 pgs.: https://www.macgregor.com/news-insights/news-articles/2018/combined-expertise-cuts-wind-turbine-installation-times/.
Aleksander Veksler et al., "Dynamic positioning with model predictive control", IEEE Transactions On Control Systems Technology, 2016, pp. 1-14.
Communication pursuant to Rule 114(2) EPC dated Feb. 9, 2024, issued in corresponding EP Application No. 20701522.3, 9 pgs.

* cited by examiner

SUPERVISORY CONTROL ARRANGEMENT
FOR A VESSEL

CROSS-REFERENCE TO RELATED
APPLICATIONS

This application claims priority to PCT/NL2020/050014, filed Jan. 10, 2020, which in turn claims priority to NL 2022366, filed Jan. 10, 2019, all contents of each of which are hereby incorporated by reference in their entireties.

FIELD OF THE INVENTION

The present invention relates to the field of a supervisory control arrangement for a vessel for installing structures onto or into a seabed and a vessel for installing structures onto a seabed.

BACKGROUND

For installing structures onto a seabed, jackup vessels are used. Jackup vessels comprise a plurality of movable legs which are lowered onto the seabed. Next, the vessel can be lifted above the sea surface on which the vessel is floating, thus decoupling the vessel from waves and current forces.

Jacking up of these vessels requires a lot of time, and per new location the entire jacking up has to performed again, which is an ineffective process. Furthermore, jackup vessels comprise many expensive moving parts which are prone to wear.

As an alternative to jackup vessels, vessel with a motion compensated gripper may be used. Such vessels are often equipped with a dynamic positioning system.

SUMMARY

The present invention aims to provide a supervisory control arrangement for a vessel for installing a structure onto or into a seabed which may increase stability and workability of the vessel.

In the following description, movements of bodies are expressed in six degrees of freedom; translation over three orthogonal axes (x, y and z) and rotation around these three axes. The z-axis is defined as the axis parallel to the gravity vector, yet orientated opposite to gravity pointing up. The x-axis is defined parallel to the average heading of the vessel. Translation over the x-axis will be referred to as surge; translation over the y-axis will be referred to as sway; translation over the z-axis will be referred to as heave. Rotation around the x-axis will be referred to as roll; rotation around the y-axis will be referred to as pitch; rotation around the z-axis will be referred to as yaw.

A first aspect provides the supervisory control arrangement for a vessel for installing a structure onto or into a seabed, the vessel comprising a dynamic positioning system for controlling a vessel position and a structure positioning system for controlling a structure position, the supervisory control arrangement comprising an input module for receiving data related to at least one of the structure positioning system and the dynamic positioning system, a processing module for processing the received data, and an output module for providing processed data to at least one of the structure positioning system, the dynamic positioning system and an operator.

The supervisory control arrangement is used to couple the dynamic positioning system and the structure positioning system. The dynamic positioning system and the structure positioning system may already be provided by the vessel; in such a case, the supervisory control arrangement is a stand-alone unit which may be added to the vessel and connected to the existing dynamic positioning system and the existing structure positioning system.

The position of the vessel is defined as the position of the vessel on the horizontal x-y-plane, which may for example be expressed as a latitude and longitude. The heading of the vessel may also be comprised by the position, wherein the heading is defined as the heading to which the nose of the vessel is pointing, for example expressed as amount of degree relative to true north. Also comprised by the position may be the course or course over ground of the vessel, which is defined as the direction of movement of the vessel. The course may be expressed as a certain amount of degrees relative to true north. The course is thus only relevant if the vessel is moving.

The dynamic positioning system may be provided with any number of actuators arranged to apply a force between the vessel and a body of water on which the vessel is floating. Such actuators may be screws, propellers, thrusters, any other actuator or any combination thereof. The actuators may be arranged to actuate one or more of the possible six degrees of freedom of the vessel, i.e. three orthogonal translation axes and a rotational axis around each translation axis. The actuators may have a certain limited ability of controlling the position of the vessel due to a limited amount of degrees of freedom that can be controlled and/or a limited amount of force an actuator can deliver. These limits create a workability range for the dynamic positioning system, which workability range may be determined or estimated by the control system as will be elaborated on further in the description.

To control the position of the vessel, the dynamic positioning system is provided with any number of sensors arranged to provide information on the current position, heading, course, and/or environmental forces acting on the vessel. Sensors for providing information on the current position may include GPS sensors, gyroscopes, motion reference units, wind sensors, relative position sensors, and other sensors for providing information on the current position.

The dynamic positioning system may be a class 1, class 2 or class 3 system, and thus have any number of redundant actuators and/or sensors which may be used in case of failure of any of the other actuators and/or sensors.

An example of a structure which may be installed by the vessel is a monopile for a wind turbine generator. The base of such a structure is to be positioned onto or at least partially into the seabed. Other structures may be installed as well, wherein the position and/or heading of such a structure may become unstable during the installation of the structure.

The structure positioning system is defined as those systems comprised by the vessel for manipulating a position of a structure. The position of the structure relates to the structure's physical position, but also its orientation. The structure positioning system may in situations comprise one of a lifting crane and a gripper, or both, depending on the situation as will be explained further-on in the description. The lifting crane may in situations comprise a lifting crane and an anti-heeling system. The structure position system may thus be regarded not as a physical system, but as a collective term used for convenience.

The structure positioning system may be provided with any number of actuators arranged for exerting forces on the structure, and thus manipulating the structure's position.

With the supervisory control arrangement according to the first aspect, the dynamic positioning system and the structure positioning system, which were separate system, may now work together more efficiently when installing the structure onto or into the seabed.

When the received data relates to an instruction for motive action by at least one of the dynamic positioning system and the structure positioning system, the processing module may be arranged to determine an expected response force acting on the vessel or the structure as a result of the instructed motive action. The output module may then be arranged to provide the expected response force as processed data to the dynamic positioning system.

An instruction for motive action may relate to a force to be delivered by one or more of any of the actuators comprised by the vessel, a desired position, heading, course, orientation, velocity, acceleration or a combination thereof of any component of the vessel or the vessel itself, any other data related to a motive action or any combination thereof.

In an embodiment of the supervisory control arrangement, the input module is arranged for receiving data related to an instruction for motive action by the structure positioning system. In such an embodiment, the processing module is arranged to determine an expected motive response of the vessel as a result of the instructed motive action to the structure positioning system. The processing module may then determine a compensating action of the dynamic positioning system to compensate for the effect of the instructed motive action. The output module is arranged for providing data to the dynamic positioning system for controlling the dynamic positioning system to perform the compensating action.

This particular embodiment may be used when a user of the vessel controls the structure positioning system. The use of the structure positioning system may result in forces exerted on the vessel, which may cause to vessel to undesirably change position. Because the supervisory control arrangement knows the motive action of the structure positioning system, a compensating action may be calculated for the dynamic positioning system which may affect the vessel such that the undesired change in position is decreased or even prevented. This is also known as feedforward control.

In examples, the input module is arranged for receiving data related to an instruction for motive action by the dynamic positioning system, the processing module is arranged to determine an expected motive response of the structure as a result of the instructed motive action and to determine a compensating action of the structure positioning system to compensate for the expected motive response of the structure, and the output module is arranged for providing data to the structure positioning system for controlling the structure positioning system to perform the compensating action.

The instruction for motive action by the dynamic position system may for example relate to a change in course and/or velocity of the vessel, and as such the motive response of the structure as a result of the instructed motive action may be a movement of the structure relative to a target position for the structure. To compensate for the expected motive response, the structure positioning system may be controlled to perform a compensating action. As a result of this compensating action, for example the position and/or orientation of the structure may at least substantially remain unchanged despite the movement of the vessel.

In another embodiment of the supervisory control arrangement, the structure positioning system comprises a lifting crane and a gripper. These may be two separate systems, both arranged for engaging the structure and manipulating one or more degrees of freedom of the structure. In such an embodiment, the processing module is arranged to, when the instruction for motive action relates to a first of the lifting crane and the gripper, determine an expected motive response of the structure as a result of the instructed motive action and determine a compensating action of a second of the lifting crane and the gripper. The output module is arranged for providing data to the second of the lifting crane and the gripper for controlling the second of the lifting crane and the gripper to perform the compensating action.

In this embodiment, the user may use either one of the gripper and the lifting crane. When both the lifting crane and the gripper are coupled to the structure, the movement of one may exert forces on the other through the structure. To compensate for those forces, the compensating action may be required.

In yet another embodiment, the input module is arranged for receiving data related to external disturbances on at least one of the vessel and the structure positioning system. In such an embodiment of the arrangement, the processing module is arranged to determine an expected motive response of at least one of the vessel and the structure positioning system as a result of the external disturbances and determine a disturbance compensating action of at least one of the dynamic positioning system and the structure positioning system to compensate for the effect of the external disturbances. Furthermore, the output module is arranged for providing data to at least one of the dynamic positioning system and the structure positioning system for controlling the at least one of the dynamic positioning system and the structure positioning system to perform the disturbance compensating action.

External disturbances may for example be forces from wind, waves or currents, which are exerted on the vessel, on the structure, or on both. These external disturbances may be estimated, predicted, or measured using sensors, and data related to the external disturbances may then be used for calculating compensating action to compensate for the external disturbances. These disturbances may also results from forces related to transition between structure installation phases wherein the structure geometric and/or mass properties may change substantially. Finally, these disturbances may also result from forces resulting from DP and/or structure positioning systems failures.

In another embodiment of the arrangement, the input module is further arranged for receiving data related to a workability range from at least one of the dynamic positioning system and the structure positioning system. The processing module is arranged for determining whether a first of the dynamic positioning system and the structure positioning system is nearing a workability limit or has reached a workability limit and determining a workability compensating action for the second of the dynamic positioning system and the structure positioning system for increasing workability of the first of the dynamic positioning system and the structure positioning system. Here, the output module is further arranged for providing data to the second of the dynamic positioning system and the structure positioning system for controlling the second of the dynamic positioning system and the structure positioning system to perform the workability compensating action.

The workability range of a specific system may be determined by the system itself, or by the supervisory control arrangement. A workability limit may apply to a particular degree of freedom, and relates to a physical limit an actuator may encounter. For example, a pneumatic cylinder has a minimal retracted position, and a maximal extended position. These positions may be defined as the workability range of said cylinder; and as a fully extended cylinder cannot extend any further, this full extension denotes a workability limit for the cylinder.

Since the structure positioning system is attached to the vessel, with the dynamic positioning system the structure positioning system may be moved as well. All degrees of freedom that are actuatable by more than one actuator may be eligible for workability compensation, as will be elaborated on further in the description.

In yet another embodiment of the arrangement, the processing module is arranged to determine a stability compensating action for at least one of the dynamic positioning system and the structure positioning system. The output module is arranged for providing data to the at least one of the dynamic positioning system and the structure positioning system for controlling the at least one of the dynamic positioning system and the structure positioning system to perform the stability compensating action.

Stability compensating actions may be used to increase stability of any of the actuators of the dynamic positioning system and the structure positioning system, and/or to prevent an instability from occurring.

The arrangement may further comprise a memory coupled to the processing module, wherein the input module is arranged to receive data on an installation stage in an installation process for installing the structure onto or into the seabed, the memory is arranged for storing at least a first algorithm and a second algorithm, and the processing module is arranged to, based on the received data on the installation stage, select one of the first algorithm and the second algorithm and operate using the selected algorithm. Examples of algorithms may be the application of a filter to data received by the input module, such as a low-pass or high-pass filter with a certain bandwidth. The bandwidth may differ for the first algorithm and the second algorithm.

Any combination of the embodiments of the supervisory control arrangement are envisioned, and any of the compensating actions may be combined at any time.

A second aspect provides a vessel for installing a structure onto or into a seabed, comprising a dynamic positioning system for controlling a vessel position, a structure positioning system for controlling a structure position, and any of the embodiments of the supervisory control arrangement.

A third aspect provides a method for installing a structure onto or into a seabed, comprising receiving data related to an instruction for motive action by at least one of a structure positioning system and a dynamic positioning system, processing the received data to determine an expected response force acting on the vessel or the structure as a result of the instructed motive action, and providing processed data related to the expected response force to at least one of the structure positioning system, the dynamic positioning system and an operator.

In examples of the method according to the third aspect, the received data comprises data related to an instruction for motive action by the dynamic positioning system. In further examples, the received data comprises data related to an instruction for motive action by the structure positioning system. As such, the received data may comprise data related to an instruction for motive action by the dynamic positioning system, the structure positioning system, or both.

When the received data comprises data related to an instruction for motive action by the dynamic positioning system, processing the received data may comprise determining an expected response force acting on the structure as a result of the instructed motive action and the processed data is provided to the structure positioning system. By providing the processed data to the structure positioning system, the structure positioning system may be controlled to perform a compensating action to compensate for the expected response force acting on the structure.

The method may further comprise receiving data on an installation stage in an installation process for installing the structure onto or into the seabed, reading a memory comprising a first algorithm and a second algorithm corresponding respectively to a first installation stage and a second installation stage, selecting one of the first algorithm and the second algorithm based on the received data on the installation stage, and processing the receiving data related to the instruction using the selected algorithm.

BRIEF DESCRIPTION OF THE FIGURES

The various aspects and embodiments thereof will now be discussed in further detail. In the figures.

DETAILED DESCRIPTION

In different embodiments of a vessel control system, different control strategies may be used. Examples of control strategies will be elaborated on using different examples in the following description. In the different figures, different installation stages in an installation process for installing the structure onto or into the seabed may be shown.

Figure 1A:
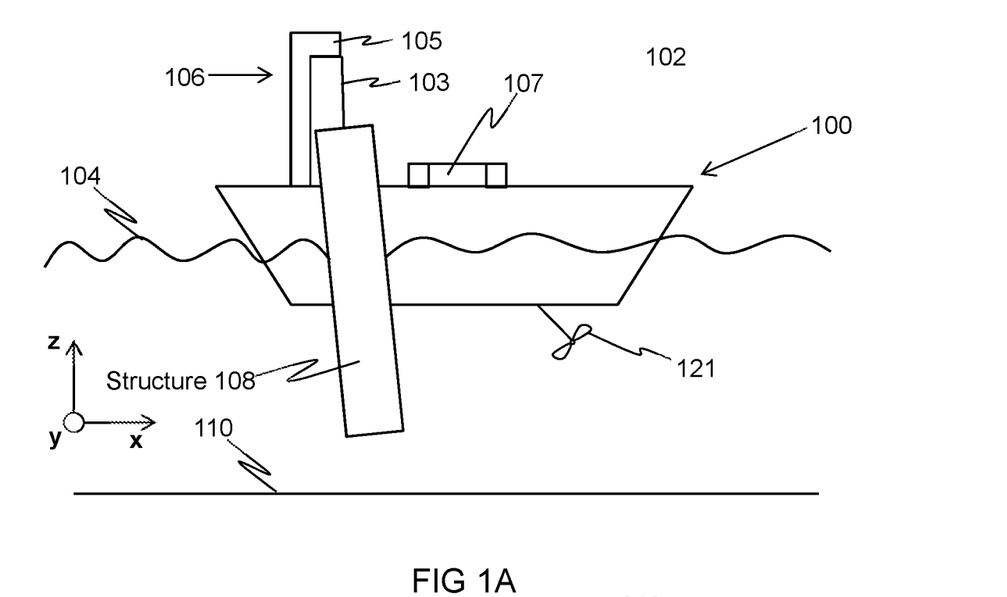
FIG. 1A shows a schematic side view of a vessel for installing a structure onto or into a seabed.
Figure 1B:
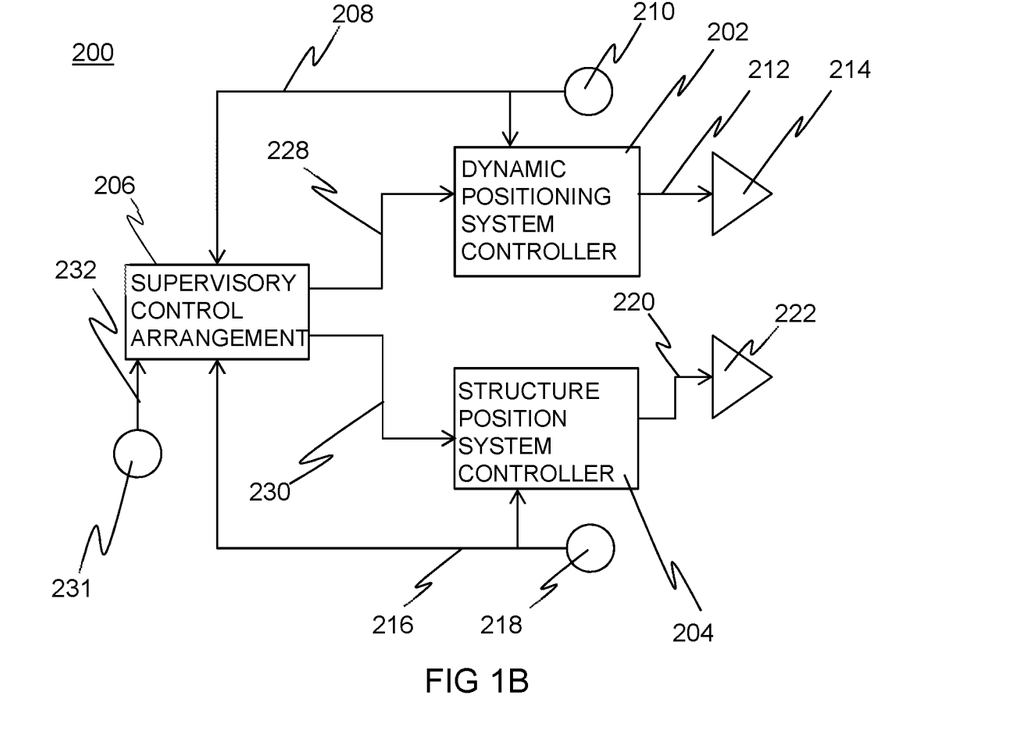
FIG. 1B shows an embodiment of a vessel control system.
Figure 2A:
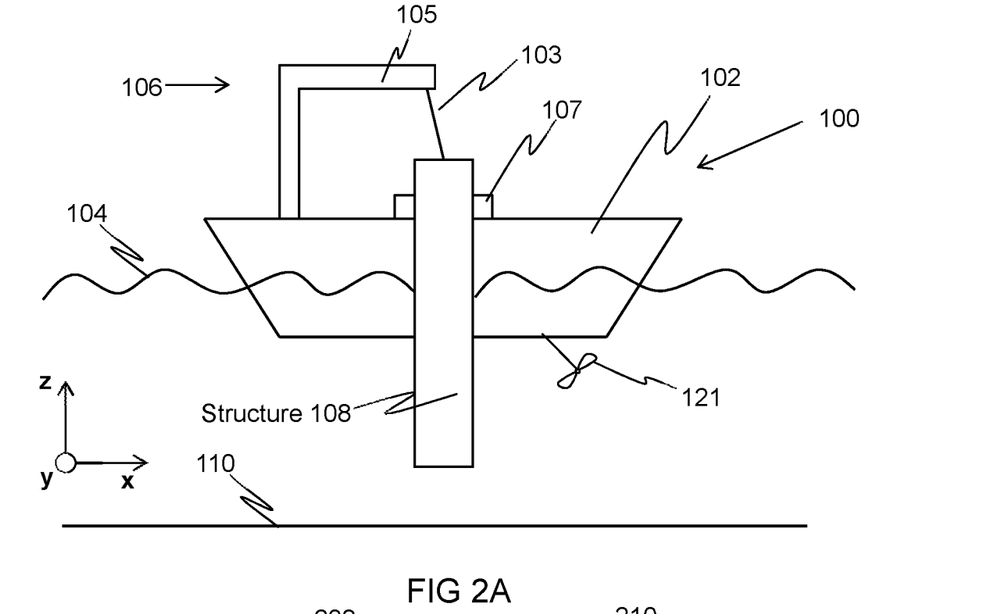
FIG. 2A shows a schematic side view of the vessel during a second stage.
Figure 2B:
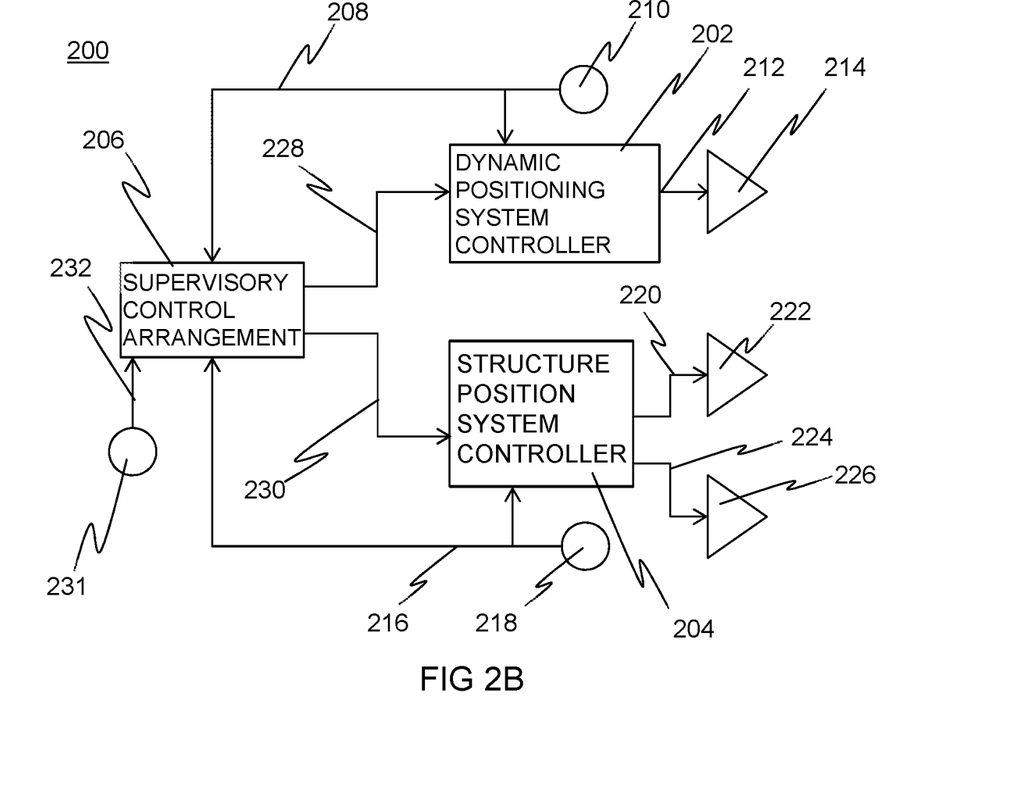
FIG. 2B shows another embodiment of the vessel control system.
Figure 3A:
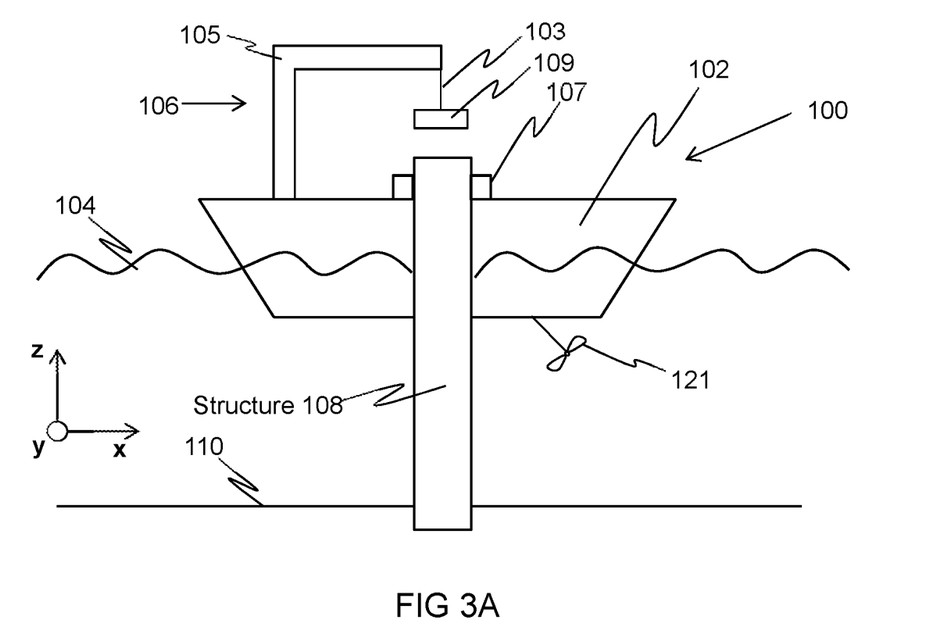
FIG. 3A shows a schematic side view of the vessel during a third stage.
Figure 3B:
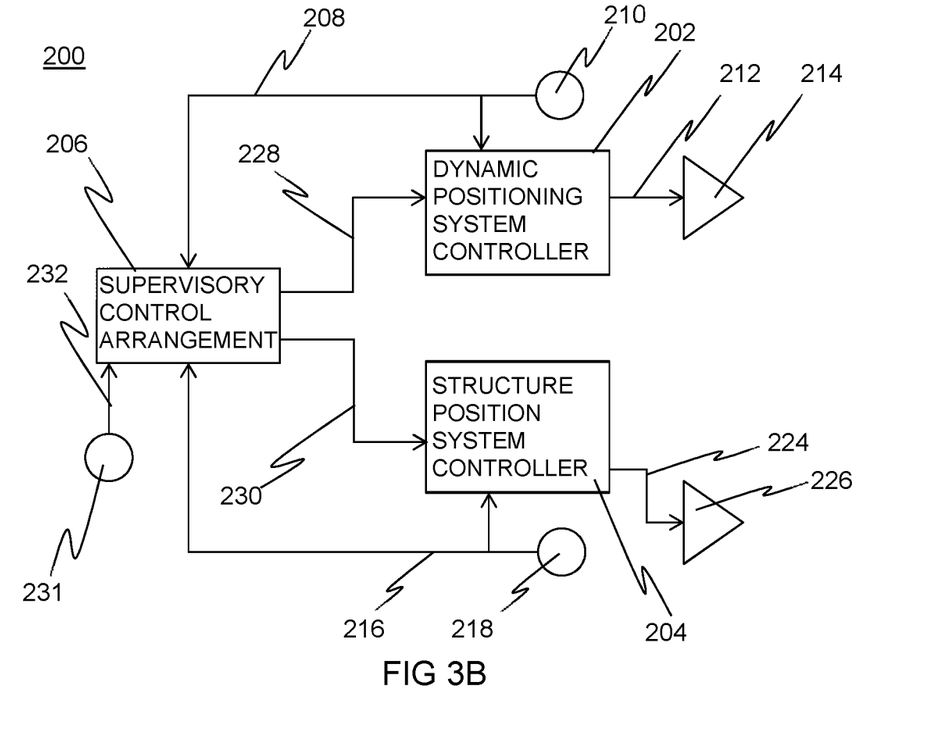
FIG. 3B shows yet another embodiment of the vessel control system.

In FIGS. 1A and 1B, the vessel comprises as actuatable systems the lifting crane as the structure positioning system, and the dynamic positioning system. In FIGS. 2A and 2B, the vessel comprises as actuatable systems the lifting crane and the gripper as the structure positioning system, and the dynamic positioning system. In FIGS. 3A and 3B the vessel comprises as actuatable systems the gripper as the structure positioning system, and the dynamic positioning system.

FIG. 1A shows a schematic side view of a vessel 100 comprising a hull 102 floating on a body of water 104, a dynamic positioning system, and a gripper 107 and a lifting crane 106 as a structure positioning system. The dynamic positioning system comprises a multitude of thrusting module comprising, for example, propeller 121, for controlling motion of the vessel 100. The vessel 100 is arranged for installing a structure 108 onto a seabed 110. The structure 108 may be a monopile as a foundation for a wind turbine, an exploration platform, other such as a jacket, or a combination thereof. The vessel 100 further comprises a vessel control system for controlling operation of the vessel 100.

The dynamic positioning system is preferably arranged for translating the vessel 100 over the horizontal x-y-plane, and to rotate the vessel around the z-axis (yaw). With these degrees of freedom controllable, the position, the heading, and the course of the vessel 100 may be controlled.

The lifting crane 106 may be provided with a hoisting rope 103 extending from a beam 105, wherein the hoisting rope 103 is connectable to the structure 108. The hoisting rope 103 may be retracted or extended for example by reeling the rope 103 respectively on or off a reel. With this retraction or extension the height of the structure 108 may be controlled. Furthermore, the lifting crane 106 is preferably arranged to rotate the beam 105 over the z-axis, and control the position on the beam 105 from which the hoisting rope 103 is extended. In total may the lifting crane 106 thus encompass three degrees of freedom: the rotation of the beam 105, the extension of the beam 105, and the extended length of the hoisting rope 103.

Alternatively, the lifting crane 105 may be embodied without an extending beam 105, but instead may the radial distance of a load relative to the lifting crane 105 be controlled by hinging a boom comprised by the lifting crane 106 over a substantially horizontal axis. Thus, the lifting crane 106 may be a derrick-type crane.

In the situation as shown in FIG. 1A, the structure 108 that is to be position onto the seabed 110 has been lifted of the hull into the body of water 104 using the lifting crane 106. In such a situation, the body of water 104 exerts forces on the structure 108 by virtue of for example waves or currents. Such forces may influence the orientation, which is defined as the yaw angle, the inclination angle, which is defined as the angle of the structure 108 with respect to the horizontal x-y-plane, and/or the position of the structure 108. Part of these forces may be transferred to the hull 102 through the lifting crane 106. The amount of force exerted by the structure 108 on the lifting crane 106 may change over time, for example due to waves causing more or less volume of the structure to be submerged in the water changing the pulling force of the structure 108 onto the lifting crane 106.

In the situation of FIG. 1A, the aim is to move the structure 108 into the gripper 107 using the lifting crane 106. To achieve that aim, a vessel control system 200 is provided which will be further elaborated on below.

FIG. 1B shows an embodiment of the vessel control system 200, comprising a dynamic positioning system controller 202, a structure position system controller 204, and a supervisory control arrangement 206 according to the first aspect.

The dynamic positioning system controller 202 is arranged for receiving a dynamic positioning sensor signal 208 from a dynamic positioning sensor module 210 and sending a dynamic positioning actuator control signal 212 to a dynamic positioning actuator module 214. The dynamic positioning sensor module may comprise at least one of a compass, a GPS transceiver, a gyroscope, an accelerometer, any other position sensor for determining at least one of velocity, position or acceleration, a wind speed sensor, a wind heading sensor, other, or a combination thereof.

The structure positioning system controller 204 is in the embodiment of the vessel control system 200 as shown in FIG. 1A arranged for receiving a lifting crane position signal 216 from a structure position system 218 and sending a lifting crane actuator control signal 220 to a lifting crane actuator module 222. The position signals may be provided by sensors connected to the lifting crane 106 or the gripper 107. Alternatively or additionally, the positions of the lifting crane 106 and the gripper 107 and/or specific elements thereof are determined by relying on positioning instructions provided to these elements.

The supervisory control arrangement 206 comprises an input module for receiving the dynamic positioning sensor signal 208, the structure positioning sensor signal 216 and optionally a user input signal 232. The supervisory control arrangement 206 further comprises an output module for sending a dynamic positioning control signal 228 to the dynamic positioning system controller 202 and a structure positioning control signal 230 to the structure positioning system controller 204. A supervisory control arrangement 206 wherein the output module is arranged for sending only one of the dynamic positioning control signal 228 and the structure positioning control signal 230 is envisioned as well.

The supervisory control arrangement 206 may further comprise a memory module (not shown) which is arranged to comprise mathematical models of the dynamic behavior of at least one of the vessel, lifting crane, gripper, structure, and the dynamic positioning system.

The supervisory control arrangement 206 further comprises a processing unit for generating the dynamic positioning control signal 228 and the structure positioning control signal 230.

In an example situation, a crane operator as a user provides the user input signal 232, which may comprise a desired position and/or speed for the lifting crane's 106 degrees of freedom. In an alternative embodiment, instead of or in addition to being provided to the supervisory control arrangement 206, the user input signal 232 is provided to the structure positioning system controller 204. If the user input signal 232 is not provided directly to the supervisory control arrangement 206, the structure positioning system controller 204 provides the user input signal 232 or a derivative thereof to the supervisory control arrangement 206.

With the supervisory controller 206 knowing at least one of the desired position and/or speed of the lifting crane's 106 degrees of freedom, a position of the structure 108, a momentum of the structure 108 and a weight of the structure 108, and/or a feedforward signal as the dynamic positioning control signal 228 may be sent to the dynamic positioning control system 202. Preferably, the dynamic positioning control signal 228 carries a value indicative of at least one of a force or a force vector acting on the vessel 100 as a result of an action of the lifting crane 106 or the gripper 107 as a result of the user input signal 232. With this feedforward signal, the dynamic positioning system may be more efficient in maintain the vessel's position, heading and/or course by pro-actively compensating for movement of the vessel 100 as a result of the action of the lifting crane 106 and movement of the structure 108.

In such a situation, thus, the following may happen: a crane operator moves a joystick as a user input device 231 to control the lifting crane 106 to move the structure 108 towards and into the gripper 107. As the lifting crane 106 moves, it exerts forces on the vessel 100 which may alter the position, heading, and/or course of the vessel 100 in the body of water 104, which may be undesired. Using the user input and the mathematical model of the vessel's dynamic behavior under influence of forces exerted by the lifting crane 106 on the vessel 100, supervisory control arrangement 206 generates the dynamic positioning control signal 228 and sends the dynamic positioning control signal 228 to the dynamic positioning control system 202 which may now compensate for the expected forces on the vessel 100 due to the lifting crane's movement.

Alternatively, as the structure 108 is moved relative to the vessel 100 using the lifting crane 106, the vessel 100 may be moved while the lifting crane 106 maintains the position of the structure 108. The movement may be the result of user control or ambient events, like wind and wash. In such a situation, the gripper 107 is thus moved towards the structure 108 by virtue of the gripper 107 being attached to the vessel 100, and the vessel 100 moving relative to the structure 108. Such a situation may occur when the lifting crane's 106 workability range is insufficient for some reason.

As another alternative, the supervisory control arrangement 206 may generate dynamic positioning and structure positioning control signals such that both the vessel 100 and the lifting crane 106 are moved simultaneously, thus working together in moving the structure 108 towards the gripper 107. In such scenario, generation of the dynamic positioning and structure positioning control signals may be based on at least one of the dynamic positioning sensor signal 208 and the user input signal 232.

After the structure 108 has been placed in the gripper 107, the structure positioning system comprises both the lifting crane 106 and the gripper 107 as both may now manipulate the position and/or orientation of the structure 108. The change of systems comprised by the structure positioning system that are active or not may be used to determine a change in installation stage in the installation process for installing the structure onto or into the seabed, from a first installation stage to a second installation stage. For the second installation change, the supervisory control arrangement 206 may require to process received data in accordance with an adapted control algorithm. Therefore, the change of installation change or detection of the transition from a first stage to a second stage may trigger change of control of the supervisory control arrangement 206 by loading a second control algorithm in the supervisory control arrangement 206 that replaced a first control algorithm employed for controlling operation of at least one of the dynamic positioning control system 202 and the structure positioning system controller 204 during the first stage.

FIG. 2A shows a schematic side view of the vessel 100 in which in a second situation the structure 108 has been placed in the gripper 107. The gripper 107 engages the structure 108. After the gripper 107 has engaged the structure 108, it may be required to change the orientation of the structure 108 by rotating the structure 108 around the z-axis to a desired orientation.

The gripper 107 is provided with one or more actuators arranged for manipulating certain degrees of freedom of the gripper 107. In a preferred embodiment of the gripper 107, the gripper 107 is translatable over an x-stroke, a y-stroke and arranged to change the orientation (rotation over the z-axis) of the structure 108 with which it is engaged.

Through the engagement between the gripper 107 and the structure 108, forces may be transferred between the structure 108 and the gripper 107. These forces may be either transferred to the hull 102 to which the gripper 107 is mounted, or compensated by one or more of the actuators of the gripper 107, or a combination thereof.

FIG. 2B shows an embodiment of the vessel control system 200 arranged for the second situation as shown in FIG. 2A wherein the structure is coupled to both the lifting crane 106 and the gripper 107. In this embodiment, the structure positioning control system controller 204 is further arranged for sending a gripper actuator control signal 224 to a gripper actuator module 226. In this embodiment the structure position sensor system 218 comprises both the lifting crane sensors and the gripper sensors.

In the situation as shown in FIG. 2A, the user may provide the user input signal 232 with information regarding at least one of a desired position on the seabed 110 where the structure 108 should be positioned, a desired orientation for the structure 108 and a desired inclination angle for the structure 108 while it is being lowered. These desired values may be an exact value; alternatively one or more may be a range in which the actual value should be confined.

With this user input signal 232, the processing module of the supervisory control arrangement 206 may generated a dynamic positioning control signal 228 and a structure positioning control signal 230 which satisfy the conditions given by the user whilst lowering the structure. The supervisory control arrangement 206 may receive the user input signal directly or via the structure positioning system controller 204. In the latter case, the structure positioning system controller 204 may, additionally or alternatively, provide the supervisory control arrangement 206 with a derivative of the user input signal 232. The dynamic positioning control signal 228 may be generated in accordance with any of examples as discussed above in conjunction with FIG. 1B. The dynamic positioning control signal 228 thus generated is provided to the dynamic positioning system controller 202 to compensate for any expected movement of the vessel 100 as a result of execution of user instructions.

After the structure 108 has landed on the seabed 110, the structure 108 may penetrate partially into the seabed 110 by virtue of the weight of the structure 108. During this penetration a force coupling between the structure 108 and the seabed 110 comes into being, which may influence the stability and/or workability of one or both of the structure positioning system and the dynamic positioning system. As with each event which may influence these stabilities and/or workabilities, a different operating algorithm may be chosen for or by the supervisory control arrangement such that one or both of the stability and the workability of one or both of the dynamic positioning system and the structure positioning system may be increased.

Choosing a different algorithm may be triggered by different types of events, such as a readout from a sensor corresponding to a certain value or range, a user input, any other event or any combination of events.

FIG. 3A shows a situation wherein the structure 108 is partially imbedded into the seabed 110 but still coupled to the gripper 107, but is not coupled to the lifting crane 106 any more. To sink the structure 108 further into the seabed 110, a hammering unit 109 may be provided on the hoisting rope 103 of the lifting crane 106 which may be repeatedly released onto the structure 108 from a height.

FIG. 3B shows an embodiment of the vessel control system 200, wherein the structure positioning system primarily consists of the gripper 107. In this embodiment, the supervisory control arrangement 206 is arranged for sending the gripper actuator control signal 224 to the gripper actuator module 226.

In any of the embodiments of the vehicle control system 200, the supervisory control arrangement 206 may be arranged for determining a stability factor of the system. Such a factor gives an indication of the global stability of the vessel which may be affected by the different actuators comprised by the vessel 100 and outside factors such as environmental factors like wind, waves and currents.

Having determined the stability factor, the processing unit of the supervisory control arrangement 206 may determine a stability compensating for at least one of the dynamic positioning system and the structure positioning system if the stability factor does not correspond to a preferred stability factor or does not fall within a preferred range of stability factors.

Figure 4A:
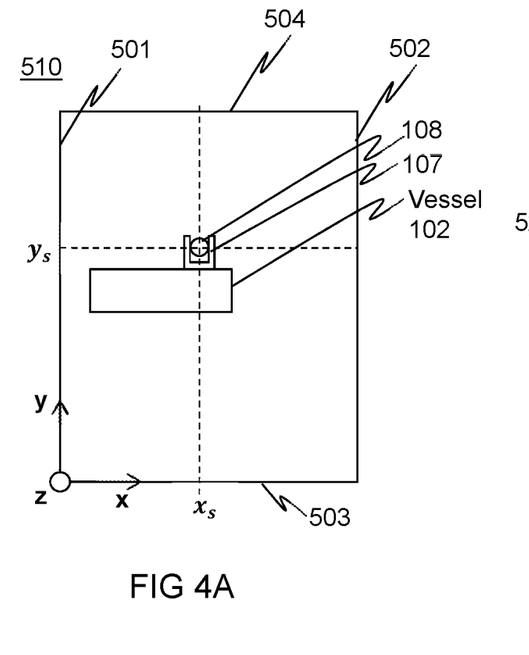
FIG. 4A shows a schematic representation of a dynamic positioning system workability range.

How the control system according to the present invention may control the dynamic positioning system and the structure positioning system for increased workability is discussed in conjunction with FIGS. 4A,B,C,D. In these figures, x_s denotes the position of the structure 108 on the x-axis, and y_s denotes the position of the structure 108 on the y-axis.

FIG. 4A shows a schematic representation of the dynamic positioning system workability range 510 at a first instance, wherein the position of the vessel 100 is shown on the x-y-plane. The dynamic positioning workability range 510 is constrained by a first x-limit 501, a second x-limit 502, a first y-limit 503 and a second y-limit 504.

The limits of the dynamic positioning workability range 510 may relate to a physical limit to the position of the vessel, i.e. an obstacle in the body of water 104 such as a pole of a wind turbine or another vessel. Alternatively or additionally, the dynamic positioning workability range 510 may relate to the amount of power available by the actuators comprised by the dynamic positioning system to move the vessel 102 in a certain direction. For example, when the actuators arranged for moving the dynamic positioning system along the x-direction as shown in FIG. 4A are operating at full power, the dynamic positioning system may be at the second x-limit 502 as no additional power is available for moving along the x-axis. To move the structure 108 further along the x-axis when the dynamic positioning system has reached the second x-limit 502 of its workability range 504, the gripper 107 may assist the dynamic positioning system by, if possible, moving the structure 108 along the x-axis.

Figure 4B:
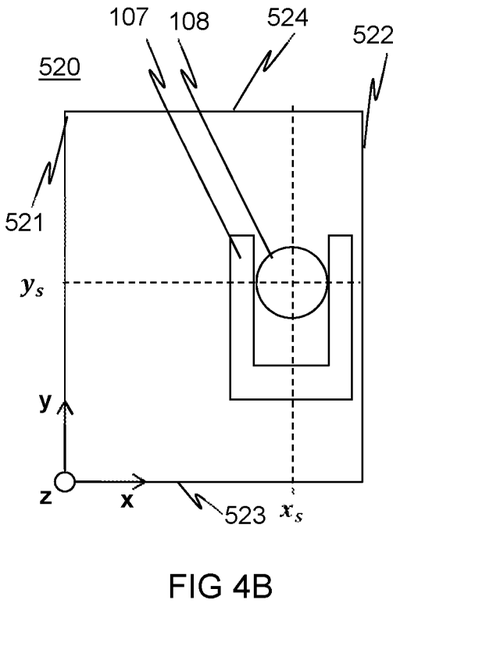
FIG. 4B shows a schematic representation of a gripper workability range.

FIG. 4B shows a schematic representation of the gripper workability range 520 at the first instance, wherein the gripper 107 is nearing the right limit 522 on the x-axis. This implies that the structure positioning control system is unable to move the gripper 107 much more to the right over the x-axis.

A gripper workability limit may relate to extreme positions of actuators comprised by the structure positioning system for manipulation the position of the gripper 107. When for example pistons are used, a fully retracted position of such a piston may relate to a first workability limit, and a fully extended position of the piston may relate to a second workability limit.

Figure 4C:
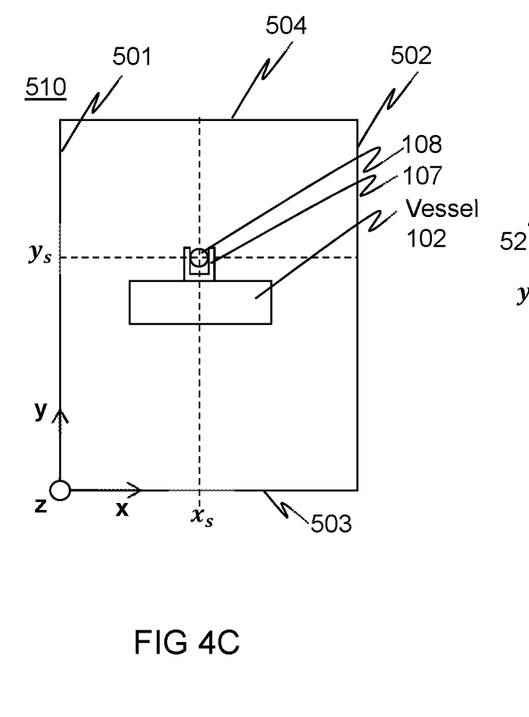
FIG. 4C shows a schematic representation of the dynamic positioning system workability range at a second instance.
Figure 4D:
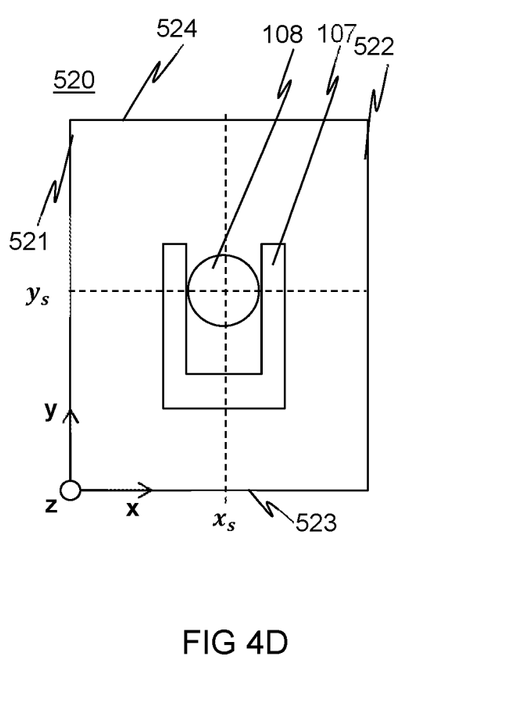
FIG. 4D shows a schematic representation of the gripper workability range at the second instance.

Situations may presents themselves in which it is desired to, starting from the first instance as shown in FIGS. 4A and 4B, have an increased workability for the gripper 107 along the x-axis. FIGS. 4C and 4D will show the dynamic positioning workability range 510 and gripper workability range 524, respectively, at a second instance. Between the first instance and the second instance, the supervisory control arrangement has provided a dynamic positioning control signal 228 and a structure positioning control signal 230 such that the workability of the gripper 107 has increased.

FIG. 4C shows a schematic representation of the dynamic positioning system workability range 510 at the second instance, wherein the position of the vessel 100 has moved towards the second x-limit 502 compared to the position of the vessel 100 in the first instance.

FIG. 4D shows a schematic representation of the gripper workability range 520 at the second instance, wherein the gripper 107 has moved away from the right limit 522 on the x-axis. The workability of the gripper 107 has thus increased in the second instance compared to the first instance. This is possible since the gripper is arranged be moved over the x-axis relative to the hull. Hence, the position of the structure may remain the same, whilst the gripper is moved one way and the vessel is moved the opposite way.

Please note that while the dynamic positioning workability range 510 and structure positioning workability range 520 are depicted in FIGS. 4A, 4C and FIGS. 4B, 4D, respectively, the workability range need not be two-dimensional rectangular shaped. For example, in the dynamic positioning workability range 510 the yaw is not shown for conciseness and clarity of the figures.

A workability range may further relate to disturbances on the respective system comprising the workability range. For example may the dynamic positioning system in a certain situation be able to work with wind speeds of 2 Beaufort more, but the structure positioning system is only able to work with wind speeds of 1 Beaufort more. In such a case, the supervisory control arrangement may give an advice on how to increase the overall workability of the vessel which in this case is limited to the workability of the structure positioning system, for example by altering the heading of the vessel.

In summary, in a vessel for installing a structure onto or into a seabed, multiple actuators comprised by a dynamic positioning system and a structure positioning system may be used for controlling a position and/or orientation of the structure. When two actuators are actuated simultaneously or in rapid succession, instabilities may occur. Furthermore, two actuators may be working in opposite directions or with opposite control goals. To increase stability and/or workability of the vessel's actuators, a supervisory control arrangement is provided to interconnect control systems of different actuators of the vessel, for example the dynamic positioning system and the structure positioning system. Where previously the dynamic positioning system and the structure position system were individually operating system, with the supervisory control arrangement one system can take into account an input and/or output of the other system.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A supervisory control arrangement for a vessel for installing a structure onto or into a seabed, the vessel comprising a dynamic positioning system for controlling a vessel position, and a lifting crane and a gripper as a structure positioning system for controlling a structure position, the supervisory control arrangement comprising:
   an input module for receiving data related to an instruction for motive action by at least one of: the lifting crane and/or gripper of the structure positioning system and the dynamic positioning system;
   a processing module for processing the received data, arranged to determine an expected response force acting on the vessel or the structure as a result of the instructed motive action; and
   an output module for providing processed data related to the expected response force to at least one of the structure positioning system, the dynamic positioning system and an operator.

2. The supervisory control arrangement according to claim 1, wherein
   the input module is arranged for receiving data related to the instruction for motive action by the structure positioning system;
   the processing module is arranged to:
      determine an expected motive response of the vessel as a result of the instructed motive action, and
      determine a compensating action of the dynamic positioning system to compensate for an effect of the instructed motive action; and
   the output module is arranged for providing data to the dynamic positioning system for controlling the dynamic positioning system to perform the compensating action.

3. The supervisory control arrangement according to claim 1, wherein
   the input module is arranged for receiving data related to the instruction for motive action by the dynamic positioning system;
   the processing module is arranged to:
      determine an expected motive response of the structure as a result of the instructed motive action, and
      determine a compensating action of the structure positioning system to compensate for the expected motive response of the structure; and
   the output module is arranged for providing data to the structure positioning system for controlling the structure positioning system to perform the compensating action.

4. The supervisory control arrangement according to claim 1, wherein processing module is arranged to, when the instruction for motive action relates to a first of the lifting crane and the gripper:
   determine an expected motive response of the structure as a result of the instructed motive action;
   determine a compensating action of a second of the lifting crane and the gripper; and wherein the output module is arranged for providing data to the second of the lifting crane and the gripper for controlling the second of the lifting crane and the gripper to perform the compensating action.

5. The supervisory control arrangement according to claim 1, wherein the input module is arranged for receiving data related to external disturbances on at least one of the vessel and the structure positioning system, the processing module is arranged to:
   determine an expected motive response of at least one of the vessel and the structure positioning system as a result of the external disturbances; and
   determine a disturbance compensating action of at least one of the dynamic positioning system and the structure positioning system to compensate for an effect of the external disturbances;
   and the output module is arranged for providing data to at least one of the dynamic positioning system and the structure positioning system for controlling the at least one of the dynamic positioning system and the structure positioning system to perform the disturbance compensating action.

6. The supervisory control arrangement according to claim 1, wherein:
   the input module is further arranged for receiving data related to a workability range from at least one of the dynamic positioning system and the structure positioning system;
   the processing module is arranged for:
      determining whether a first of the dynamic positioning system and the structure positioning system is nearing a workability limit or has reached a workability limit, and
      determining a workability compensating action for the second of the dynamic positioning system and the structure positioning system for increasing workability of the first of the dynamic positioning system and the structure positioning system;
   the output module is arranged for providing data to the second of the dynamic positioning system and the structure positioning system for controlling the second of the dynamic positioning system and the structure positioning system to perform the workability compensating action.

7. The supervisory control arrangement according to claim 1, wherein
   the processing module is arranged to determine a stability compensating action for at least one of the dynamic positioning system and the structure positioning system;
   the output module is arranged for providing data to the at least one of the dynamic positioning system and the structure positioning system for controlling the at least one of the dynamic positioning system and the structure positioning system to perform the stability compensating action.

8. The supervisory control arrangement according to claim 1, further comprising a memory coupled to the processing module, wherein:
   the input module is arranged to receive data on an installation stage in an installation process for installing the structure onto or into the seabed;
   the memory is arranged for storing at least a first algorithm and a second algorithm; and the processing module is arranged to, based on the received data on the installation stage, select one of the first algorithm and the second algorithm and operate using the selected algorithm.

9. The vessel for installing a structure onto or into a seabed, the vessel comprising a dynamic positioning system for controlling a vessel position, a lifting crane and a gripper as a structure positioning system for controlling a structure position, and a supervisory control arrangement according to claim 1.

10. A method for installing a structure onto or into a seabed, comprising using a vessel comprising a dynamic positioning system for controlling a vessel position, and a lifting crane and a gripper as a structure positioning system for controlling a structure position, comprising:
    receiving data related to an instruction for motive action by at least one of: the lifting crane and/or gripper of the structure positioning system and the dynamic positioning system;
    processing the received data to determine an expected response force acting on the vessel or the structure as a result of the instructed motive action; and
    providing processed data related to the expected response force to at least one of the structure positioning system, the dynamic positioning system and an operator.

11. The method according to claim 10, wherein the received data comprises data related to the instruction for the motive action by the dynamic positioning system.

12. The method according to claim 10, wherein the received data comprises data related to the instruction for the motive action by the structure positioning system.

13. The method according to claim 11, wherein processing the received data comprises determining an expected response force acting on the structure as a result of the instructed motive action and the processed data is provided to the structure positioning system.

14. The method according to claim 10, further comprising:
    receiving data on an installation stage in an installation process for installing the structure onto or into the seabed;
    reading a memory comprising a first algorithm and a second algorithm corresponding respectively to a first installation stage and a second installation stage;
    selecting one of the first algorithm and the second algorithm based on the received data on the installation stage; and
    processing the receiving data related to the instruction using the selected algorithm.

15. The method according to claim 14, further comprising:
    detecting a transition from the first installation stage to the second installation stage;
    selecting the second algorithm; and
    processing the received data related to the instruction using the second algorithm.

* * * * *